Patented Jan. 15, 1952

2,582,741

UNITED STATES PATENT OFFICE 2,582,741

PHONOGRAPH RECORD MOLDING COMPOSITIONS AND RECORDS

Joseph W. Ayers, Easton, Pa., assignor to Agrashell, Inc., a corporation of Delaware No Drawing. Application October 18, 1947, Serial No. 780,749

16 Claims. (Cl. 260—9)

This invention relates to phonograph records and to filled molding compositions from which such records may be produced. More particularly it relates to phonograph record molding compositions and records containing a ligno-cellulose filler of the novel properties hereinafter described, in admixture with a plastic or resinous base, and ordinarily also with a plasticizer, a mold lubricant and a stabilizer.

Substantially all commercial phonograph records are molded from thermoplastic natural or synthetic resin compositions containing one or more fillers necessary either to control the consistency of the composition or to impart wear resistance or sound reproducing fidelity to the records. Because of their hardness and cheapness, inorganic fillers have generally been employed such as ground slate, carbonates and silica. The addition of such fillers even after their subjection to finest mechanical grinding leads to records producing substantial amounts of surface noise when played.

An object of the present invention is to produce records which though containing a filler content in equal or larger amounts than records marketed heretofore have superior properties and advantages without the aforementioned and other defects.

Specifically, it is an object of this invention to provide phonograph record molding compositions having substantial quantities of filler therein from which improved phonograph records may be produced having reduced surface noise, greater form stability, and greater wear resistance, and at a low cost. Broadly considered, the phonograph molding compositions of the present invention are composed of a plastic or resinous molding compound together with a very finely divided, hard, dense, non-fibrous organic ligno-cellulose filler containing at least 45% by weight of combined pentosans, hexosans and lignins. Generally also a suitable plasticizer, mold lubricant and stabilizing agent are included in the compositions. The diameter of the largest particles in the filler is not more than 30 microns and 90% of the particles have a diameter finer than 25 microns. The filler is also preferably closely fractionated such that at least 40% are between 10 and 25 microns.

The ligno-cellulose fillers may be further defined as materials derived from natural vegetable shell materials including endocarps, as the shells of English walnuts, black walnuts, pecans, Brazil nuts, cocoanuts and the like and including the pits of apricots, olives, cherries, dates, peaches and the like and also hard, dense barks of a number of trees having a cell structure which is non-fibrous.

These non-abrasive ligno-cellulose materials possess a remarkable resistance to solvents, water, weak acids and weak alkalies and hence the phonograph records produced therefrom have surprising inertness and stability against wide ranges of temperature and humidity conditions.

One of the typical ligno-cellulose fillers made from natural vegetable material contemplated by the present invention contains the following components:

CHEMICAL ANALYSIS

Determinations on dry basis

| | Per cent by wt. |
|---|---|
| Nitrogen (N) | .10 |
| Furfural (calculated as pentosan) | 10.00 |
| Sugar (calculated as glucose) | .30 |
| Cellulose | 60.00 |
| Lignin | 24.00 |
| Cutin | 5.00 |
| Methoxyl | 6.50 |
| Chlorine (Cl) | .10 |
| Ash | .50 |

The inertness and resistance to dissolution of the above ligno-cellulose filler may be judged from the following table:

SOLUBILITIES

Determinations on dry basis

| | Per cent by wt. |
|---|---|
| Ether | .50 |
| Alcohol (95% for 4 hours) | 3.00 |
| Cold water | 1.00 |
| Hot water | 2.50 |
| Acetone | 3.00 |
| 1% sodium hydroxide | 14.00 |
| 10% sulphuric acid | 4.54 |

These novel ligno-cellulose filler materials can be successfully substituted wholly or in part for any of the ordinary fillers in the usual plastic resinous molding compositions used for phonograph record production. The compositions having a natural resin base and in particular shellac have improved properties over prior conventional shellac compositions. Vinyl resin compositions containing the said fillers also have exceptional and valuable properties. Because of the unique properties of these filler materials, large proportions may be employed successfully. Ordinarily at least 35% by weight may be used and in some compositions as much as 60% may be employed. However, records produced from compositions containing as little as 20% of the filler have improved qualities.

Ligno-cellulose fillers exceptionally satisfactory in the compositions of the present invention are those ground by the process and apparatus described in my copending application, Serial No. 683,226 filed July 12, 1946 now U. S. Patent No. 2,561,043 and classified by the process of my application Serial No. 683,227 also filed on July 12, 1946 now U. S. Patent No. 2,554,450. A typical particle distribution in the ground walnut shell flour is 0% particles greater than 30 microns, 10% at from 25 to 30 microns, 60% less than 20 microns and 20% smaller than 10 microns, all parts being by weight; the average diameter of such material being less than 12 microns and the specific surface area approximately 5,000 sq. cm. per gram.

Phonograph record molding compositions in which the filler content is composed exclusively of the ligno-cellulose products of the character herein described constitute the preferred embodiments of the present invention. However, compositions containing an inorganic filler in addition to the novel ligno-cellulose filler of the present invention possess improved properties over compositions containing inorganic fillers or conventional cellulosic fillers or both.

A preferred composition of the present invention has a high filler content consisting of the ligno-cellulose material in a quantity of about 50%. Such composition has almost double the volume of molding compositions containing the conventional inorganic fillers in equal weights. It is therefore possible to produce almost twice as many records from the compositions of the present invention as from such prior compositions. Furthermore, the present records have an advantage in weighing hardly more than one-half equally filled conventional records.

The records produced in accordance with the present invention as compared with conventional records produce less surface noise, have greater form stability and have greater wear resistance. These improved properties are attributable to the unique properties of the ligno-cellulose fillers employed, including their compatibility and binding power in molded resins, and to the particle size distribution and maximum size of the particles.

It has been determined that at 5,000 cycles, in which range surface noise is most disturbing and noticeable to the human ear, a needle deflection of .00005 inch or less will not create a disturbing interference. It has also been determined that the finely divided ligno-cellulose filler of the present invention in records will not cause needle deflection as great as the indicated amplitude and hence surface noise caused by needle deflection does not occur, even though wearing away of the shellac or other binding resin due to needle abrasion will cause the filler particles to protrude and deflect the needle.

This avoidance of objectionable deflection is due not only to small particle size of the ligno-cellulose particles but also to the compliant properties of the material in the resin base, which properties are not possessed by inorganic fillers which are generally hard, rigid and abrasive and hence non-compliant.

The invention is brought out in the following examples given by way of illustration:

*Example 1*

| | Pounds |
|---|---|
| Shellac | 26 |
| Congo gum | 8 |
| Pine tar resin (vinsol resin) | 14½ |
| Cotton flock | 5½ |
| Zinc stearate | 1½ |
| Calcium carbonate | 80 |
| Barium sulphate | 36 |
| Ligno-cellulose flour filler | 24 |
| Carbon black | 4½ |
| Total | 200 |

This formula contains a comparatively low percentage of any one of the hereinbefore disclosed ligno-cellulose fillers. The composition possesses a specific gravity around 1.884.

*Example 2*

| | Pounds |
|---|---|
| Shellac | 26 |
| Congo gum | 8 |
| Pine tar resin (vinsol resin) | 14½ |
| Cotton flock | 5½ |
| Zinc stearate | 1½ |
| Walnut shell flour filler | 60 |
| Carbon black | 4½ |
| Total | 120 |

The formula of this example, it will be observed, contains an extender content composed exclusively of the ligno-cellulose filler, it being present in the larger proportion of 50% of the total mass. The specific gravity of this composition is only 1.170.

*Example 3*

| | Pounds |
|---|---|
| Vinyl resin base | 40 |
| Butadiene-acrylonitrile synthetic rubber (35% by weight of acrylonitrile) | 4½ |
| Hydrated lime | 1 |
| Carnauba wax | 1½ |
| Carbon black | .955 |
| Apricot pit shell flour filler | 50 |
| Plasticizer | 2 |
| Anti-oxidant | .045 |
| Total | 100.0 |

It will be observed that the filler likewise consists of a single material, that is the ligno-cellulose extender of the present invention. The specific gravity of this composition is 1.35.

When the formula of Example 1 is compared with the formula of Example 2, it will be observed that 200 pounds of the first composition provides 106.13 volumes whereas the 120 pounds of the second formula makes up to 95.67 volumes. Although there is a difference of 80 pounds in the total weights of the two compositions, there are nearly as many volumes present in the second composition as in the first composition. This means that almost as many records can be produced from the second composition weighing 120 pounds as from the first composition weighing 200 pounds. A record prepared from the second composition will weight only 63% as much as the record of the same size and thickness prepared from the first composition.

It should be understood that the ingredients hereinbefore set out are given merely by way of example and that compositions containing other conventional or known materials capable of serving the same purposes are also contemplated. Other plasticizers which may be employed include phthalic esters, chlorinated diphenyl derivatives, tricresyl derivatives, halogenated naphthalene derivatives, glycol esters and the like. Other stabilizers are for example, calcium carbonate, lead carbonate and lead titanate. Other wax lubricants are montan and candelilla waxes. As an antioxidant there may be mentioned phenyl-beta-naphthylamine. As a preferred vinyl resin base there may be mentioned a vinyl chloride-vinyl acetate resin in the proportion of 70 to 30 parts by weight.

The organic fillers of the present invention are so fine in texture that the consistency of the vinyl resin base compositions may be effectively employed having a very wide range of proportions and yet impart to the records produced therefrom a minimum of surface noise over the entire range. The filled compositions are economical both in cost of raw materials and cost of compounding. They readily lend themselves to processing such as to working, pressing and blanking. The records produced from such compositions have excellent characteristics with respect to both fidelity of reproduction and length of playing life.

The compositions of the invention may be compounded on conventional processing equipment. Mixing times and temperatures in the same range as now used with other conventional compositions may be employed. In compounding the vinyl resin base compositions, the individual components are first weighted out and after preferably being mixed dry for a period of a few minutes, they are next placed in a Banbury or similar type mixer or upon differential rolls. The composition is then worked for several minutes until the dispersion of the extender used is complete, the temperature employed suitably being in the neighborhood of 270° F. After being cut a number of times with a doctor blade, the stock is formed into biscuits in conventional manner. In the molding or pressing operation the biscuits are suitably heated to 210° F. or above, and pressure of from 1500 to 4000 pounds per square inch is applied, depending upon the type and size of record being pressed. Steam heating for a period of seven seconds to a stamper temperature of 270° F. is usually sufficient, after which cool water is applied to the die for thirty seconds or more, thereby, making the total pressing cycle of thirty-seven seconds or more, depending upon the temperature of the cooling water used.

Because the composition is highly loaded with the ligno-cellulose extender, air bubbles are not entrapped in the pressed material and hence the percentage of imperfect and rejected records pressed is much less than when ordinary Vinylite compositions are pressed. The rippled flash from the record can be removed easily by breaking it off by hand, which advantage is in strong contrast to the tough, horny Vinylite flash requiring cutting or dieing. The scrap and trimmings from the pressing operation of the present compositions may be suitably reground on disintegrating mills commonly used to process shellac scrap. The pre-heating required and other problems encountered in the recovery of Vinylite scrap are eliminated.

It should be understood that the present invention is not limited to the specific examples of materials or proportions herein given, but that it extends to all equivalent materials and variations which will occur to those skilled in the art upon consideration of the scope of the claims appended hereto. In the claims all proportions are by weight.

I claim:

1. A thermoplastic phonograph record molding composition having therein an extender composed of a finely divided, hard, ligno-cellulose filler containing at least 45% of combined pentosans, hexosans and lignins, the particles of which are not more than 30 microns in diameter and 90% of which are finer than 25 microns.

2. A filled, thermoplastic phonograph record, molding composition the filler content of which consists of a finely divided, hard, ligno-cellulose extender containing at least 45% of combined pentosans, hexosans and lignins, the particles of the filler being not more than 30 microns in diameter and 90% of which are finer than 25 microns.

3. A thermoplastic phonograph record, molding composition having therein from 20 to 60% of an extender composed of a finely divided, hard, ligno-cellulose filler containing at least 45% of combined pentosans, hexosans and lignins, the particles of the filler being not more than 30 microns in diameter and 90% of which are finer than 25 microns.

4. A filled thermoplastic phonograph record molding composition, the filler content of which amounts to 20-60% of the composition and consists of a finely divided, hard, ligno-cellulose extender containing at least 45% of combined pentosans, hexosans and lignins, the particles of the filler being not more than 30 microns in diameter and 90% of which are finer than 25 microns.

5. A thermoplastic phonograph record molding composition having therein an extender composed of a finely divided, nut shell material containing at least 45% of pentosans, hexosans and lignins, the particles of which are not more than 30 microns in diameter and 90% of which are finer than 25 microns.

6. A filled, thermoplastic phonograph record molding composition, the filler content of which consists of finely divided, vegetable material containing at least 45% of pentosans, hexosans and lignins, the particles of which are not more than 30 microns in diameter and 90% of which are finer than 25 microns.

7. A thermoplastic phonograph record molding composition having therein an extender composed of a finely divided, ligno-cellulose filler containing at least 45% of combined pentosans, hexosans and lignins, the particles of the filler being not more than 30 microns in diameter and 90% of which are finer than 25 microns, 30% or more of which particles are between 10 and 25 microns.

8. A thermoplastic phonograph record molding composition having therein an extender composed of finely divided, walnut shell flour, the particles of which are not more than 30 microns in diameter and 90% of which are finer than 25 microns.

9. A filled, thermoplastic phonograph record, molding composition, the filler content of which consists of finely divided, walnut shell flour, the particles of which are not more than 30 microns in diameter and 90% of which are finer than 25 microns.

10. A thermoplastic phonograph record, molding composition having therein from 20 to 60% of finely divided walnut shell flour, the particles of which are not more than 30 microns in diameter and 90% of which are finer than 25 microns.

11. A thermoplastic phonograph record having at least one reproducing surface composed of a resin base and a finely divided, hard, ligno-cellulose filler containing at least 45% of combined pentosans, hexosans and lignins, the particles of which are not more than 30 microns in diameter and 90% of which are finer than 25 microns.

12. A thermoplastic resin base phonograph record, the filler content of which consists of a finely divided, hard, ligno-cellulose extender containing at least 45% of combined pentosans, hexosans and lignins, the particles of said extender being not more than 30 microns in diameter and 90% of which are finer than 25 microns.

13. A thermoplastic resin base phonograph record containing from 20 to 60% of a finely divided, hard, ligno-cellulose filler containing at least 45% of combined pentosans, hexosans and lignins, the particles of said filler being not more than 30 microns in diameter and 90% of which are finer than 25 microns.

14. A phonograph record composed of a thermoplastic resin base and from 50-60% of a finely divided filler consisting of a vegetable shell material containing at least 45% of pentosans, hexosans and lignins, the particles of which are not more than 30 microns in diameter and 90% of which are finer than 25 microns.

15. A phonograph record composed of a thermoplastic resin base and a filler composed of hard, dense, fruit shell material the particles of which are not more than 30 microns in diameter and 90% of which are finer than 25 microns.

16. A phonograph record composed of a thermoplastic resin base and finely divided walnut shell flour, the particles of which are not more than 30 microns in diameter, 90% of which are finer than 25 microns and 30% of which are between 10 and 25 microns.

JOSEPH W. AYERS.

REFERENCES CITED

The following references are of record in the file of this patent:

UNITED STATES PATENTS

| Number | Name | Date |
|---|---|---|
| 2,006,378 | Whyte et al. | July 2, 1935 |
| 2,307,180 | Yngve | Jan. 5, 1943 |
| 2,319,182 | Van der Pyl | May 11, 1943 |
| 2,343,247 | Simons | Mar. 7, 1944 |
| 2,412,599 | Buell | Dec. 17, 1946 |